UNITED STATES PATENT OFFICE.

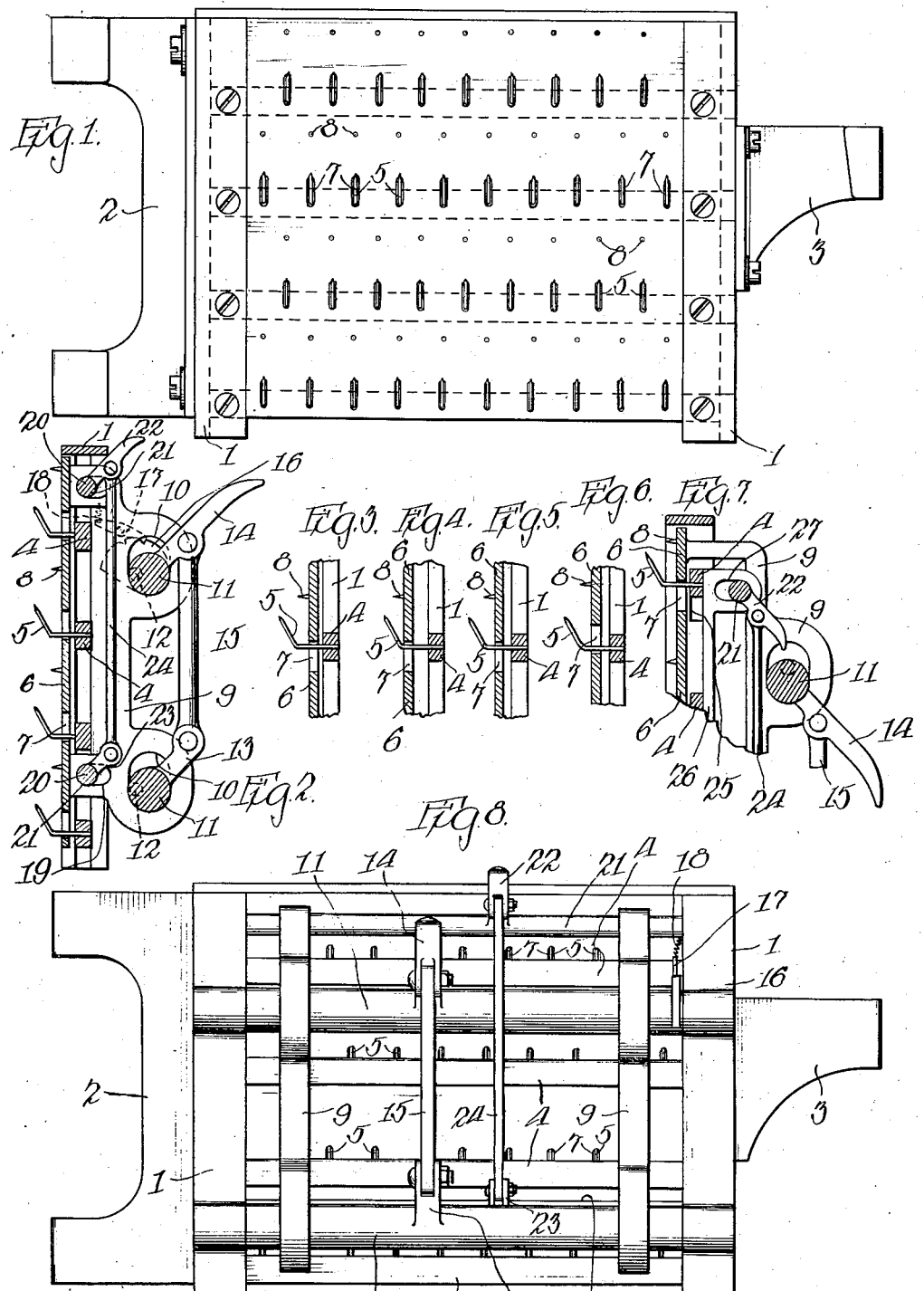

HENDRIK STUKART, OF LAPORTE, INDIANA, ASSIGNOR TO U. S. SLICING MACHINE COMPANY, OF LAPORTE, INDIANA, A CORPORATION OF INDIANA.

BACK PLATE FOR SLICING-MACHINES.

1,278,056.  Specification of Letters Patent.  Patented Sept. 3, 1918.

Application filed July 17, 1916. Serial No. 109,601.

*To all whom it may concern:*

Be it known that I, HENDRIK STUKART, a subject of the Queen of Holland, residing at Laporte, in the county of Laporte and State of Indiana, have invented certain new and useful Improvements in Back Plates for Slicing-Machines, of which the following is a specification.

This invention relates to a device for holding a piece of meat on the meat table of a slicing machine. The principal object of the invention is to provide a new and simple construction for this purpose by means of which meat can be efficiently held and easily engaged and disengaged from the meat clamping position. The invention consists in the features of novelty in the construction, combination and arrangement of the several parts.

In the accompanying drawings, Figure 1 is a front elevation of a back plate constructed in accordance with the principles of this invention; Fig. 2 is a sectional view showing the device in position after the meat is discharged; Figs. 3 to 6 are detail views showing other positions of the meat-holding parts; Fig. 7 shows a modification in which the bars are movable, and Fig. 8 is a back view of the device.

In holding meat for slicing it is desirable not only that the meat-holding means be suitable for efficiently holding the meat during the slicing operation, but also that the meat may be easily and quickly secured to the back plate, and as easily and quickly removed therefrom. With certain types of back plates it is extremely difficult to remove the last slice or butt of the meat after all the slices have been cut therefrom by the slicing machine. The present invention contemplates a back plate in which the meat is not only held firmly in position but it is also easily removed because of the fact that the plate proper has a double movement, in one direction forward and from the prongs to disengage the meat from the prongs and in the other direction to lock the meat with respect to the prongs.

In the accompanying drawings, a frame is shown comprising end pieces 1 to which are secured brackets 2 and 3 with cross-bars 4 connecting the end plates. The brackets 2 and 3 are for the purpose of easily connecting and disconnecting the back plate to the meat support of a slicing machine.

Projecting from the bars 4 are a number of rows of prongs 5 which are bent or inclined at their outer ends all in the same direction. These prongs are sharpened at their outer ends and the angle of inclination to the face plate is preferably less than a right angle. A meat plate 6 is provided with a number of slots 7 through which the prongs 5 extend. In the outer face of this plate 6 are a number of projections or pins 8, one opposite or in line with each of the slots 7. It will be seen, therefore, that there is a pin 8 for each prong 5 and the plate 6 being slotted will permit the relative movement of the plate with respect to the prongs in two directions, one toward the shank of the prong and the other outwardly. When the plate is in its innermost position it will be noted that the extremities of the pins terminate in substantially the same plane at which the bends in the outer ends of the prongs are made. With the plate in its outermost position the outer face is substantially flush with the edges of the end plates 1.

The slots 7 in the plate 6 permit a double movement of the plate 6 with respect to the frame and to the prongs which project therefrom, and the plate is therefore provided with supports 9 which extend to the rear side of the frame between the bars 4 and is provided with perforations 10. Extending through the perforations 10 are cam bars 11 which are provided with eccentric pivots 12 mounted in the end pieces 1. Extending from one of the bars 11 is an arm 13 and extending from the other is an arm 14 connected with the arm 13 by means of a link 15 so that the two bars 11 can be rotated simultaneously. The rotation of the arm 14 which is preferably formed with a handle moves the plate 6 inwardly and outwardly with respect to the outer side of the bars 4 and at one end of one of the bars 11 is a notched portion 16 of which the notches are engaged by a pivoted pawl 17 having a spring 18 for forcing it yieldingly in engagement with the notches.

The supporting members 9 are also provided with perforations 19 through which bars 20 extend parallel with the cam bars 11. These bars 20 are also eccentrically mounted by means of pivots 21 seated in the end members, and one is provided with a handled lever 22 and the other with an arm 23 joined by a link 24 for moving them in unison. The rotation of these bars 20 causes the movement of the plate 6 transversely of the bars 4 or toward and away from the shanks of the prongs 5. Thus it is obvious that there are two separate and independent means for moving the plate 6 in different directions, one at an angle to the other, with respect to the bars 4 and to the prongs 5.

In operation, Fig. 3 represents the relative positions of the parts when the meat is applied to the holder; the plate 6 being as close as possible to the bars 4. The locking operation is then performed by moving the eccentric bars 11 which places the parts in the position shown by Fig. 4, the meat being clamped between the plate 6 and the bent or inclined end of the prongs 5 and the pins 8 serving to hold the meat in place. When it is desired to release the meat from engagement with the back plate, the plate 6 is moved backward from the point of the prongs a short distance, as represented in Fig. 5, by rotating the eccentric bars 11, as before explained. The eccentric bars 20 are then operated to move the plate so that the prongs are at the other end of the slots, as indicated by Fig. 6, whereupon the pins 8 will then carry the meat away from or substantially clear from the bent extremities of the prongs 5, and the last or remaining slice can be easily removed by lifting it from the pins 8 without any trouble. Thus it is clear that the movement of the plate 6 transversely with respect to the shanks of the prongs 5 is for the purpose of disengaging the last slices from the prongs. With this construction it is obvious that the meat is easily placed on the back plate and is firmly held and locked in position for slicing the meat; after the meat is all sliced, or in fact at any time, it is easy to remove the meat from the back plate by simply disengaging it from the fastening prongs in the manner above set forth.

A modification of this construction is shown by Fig. 7 in which the bars 4, instead of being fixed, are mounted in slots 25 at the ends and are connected by means of back pieces 26 which are provided with perforations 27 through which the bars 21 extend, the ends of the bars being mounted in the end pieces 1, as before explained. The difference in operation that this construction produces is that the plate 6 is moved to and from the bars 4 by means of the eccentric bars 11, but to disengage the meat from the prongs 5, the bars 4, which carry the prongs, are slid transversely, moving the prongs away from the pins 8. The result of this action is the same as that of the construction shown in section by Fig. 2.

I claim:

1. A meat-holding device comprising an abutment plate, prongs coöperating with said plate for holding a piece of meat against the surface thereof, means for shifting said prongs and plate relative to one another in a direction transverse to the direction of the plane of said plate to cause said prongs and plate to grip a portion of the meat between them for holding said meat in place, and supplemental prongs for entering said meat to prevent movement of said meat relative to said plate in the direction of the plane thereof.

2. In a meat holding device, a plurality of meat engaging prongs, and pins movable relative to said prongs for stripping the meat from said prongs.

3. In a meat engaging device, prongs arranged to engage a piece of meat in a direction at an oblique angle to the surface of said meat, and pins arranged to enter said meat at a right angle to said surface.

4. In a meat holding device, a frame, meat engaging prongs extending from said frame at an oblique angle thereto, and pins for entering said meat at a different angle from that of said prongs.

5. In a meat holding device, a frame, a plurality of prongs carried by said frame at an oblique angle thereto for engaging a piece of meat, pins arranged perpendicular to said frame for engaging said meat, and means for shifting said prongs and said pins relative to one another.

6. In combination, a frame, a plurality of projecting prongs carried by said frame, and a perforated plate through which the prongs extend movable in two directions one at right angles to the other.

7. In combination, a frame, a plurality of prongs carried by said frame and bent in the same direction from a common plane, and a plate having perforations through which the prongs extend movable at right angles to the prongs and outwardly until the outer face thereof coincides with the plane from which the points of the prongs are bent.

8. A meat-holding back plate comprising a frame, a plurality of prongs extending from the frame, and a movable plate having slots therein through which the prongs extend to allow the plate to be moved in two directions with respect to the prongs, one at an angle to the other.

9. In meat holding mechanism, a plurality of fixed prongs, and a plurality of pins movable toward said prongs in a direction transverse to the surface of the material engaged by said prongs.

10. In a back plate, the combination with a fixed frame, meat engaging prongs on said frame, and a member movable parallel with the face of the frame and also outwardly therefrom.

11. In a meat-holding back plate, a frame, meat engaging prongs on said frame and a plate separately movable in two directions one parallel with the face of the frame and the other outwardly therefrom.

12. In a meat-holding back plate, a frame, meat engaging prongs on said frame, a plate movable with respect thereto, and separate means for moving the plate in two directions, one at an angle to the other.

13. A meat-holding plate comprising a frame, meat engaging prongs on said frame, a movable plate, and similar means for moving the plate separately in two directions, one at an angle to the other.

14. In a back plate, a frame, meat engaging prongs on said frame, a plate movable with respect to the frame, means mounted in the frame for moving the plate, and a locking device for said means.

15. In a back plate, a frame, a movable member having perforated parts extending through the frame, and means eccentrically mounted in the frame for engaging the perforations of said parts to move the frame separately in two directions with respect to the frame.

16. A meat-holding back plate, a frame, and prongs projecting therefrom, a movable member having perforations through which the prongs extend, and means for moving the plate with respect to the frame for clamping meat placed thereon on the prongs.

17. In a meat-holding back plate, a frame, prongs extending therefrom having inclined outer ends, a plate with perforated slots through which the prongs extend, and means for moving the plate in one direction to disengage meat from the prongs and in another direction to bind the meat in place.

18. A meat-holding back plate comprising a frame, prongs extending therefrom having inclined outer ends, a plate having slots through which the prongs extend, means for moving the plate from the prongs to disengage meat pressed between the plate and the prongs, and separate means for moving the plate outwardly to bind the meat against the bent extremities of the prongs.

19. In a meat-holding back plate, the combination with a frame having projecting prongs, of a plate having perforations through which the prongs extend, meat engaging pins carried by the plate one opposite each prong, and means to move the plate in two directions with respect to the frame, one to disengage the meat from the prongs by means of pins, and the other to lock the meat on the prongs.

20. In a meat-holding back plate, the combination with a frame, of prongs extending therefrom and bent at the outer ends, a plate having slot shaped perforations through which the prongs extend, projecting members in the face of the plate opposite each of said slots, means to move the plate toward and from the prongs parallel with the face of the plate, and separate means to move the plate outwardly toward the ends of the prongs.

21. In a meat-holding back plate, the combination with a frame comprising a plurality of cross bars, of prongs extending therefrom inclined in the same direction at the outer ends thereof, a plate having slot shaped perforations through which the prongs extend, pins carried by the plate one in advance of each slot, perforated supporting members for the plate extending through the bars of the frame, means mounted in the frame for engaging certain of the perforations of the supporting means to move the plate in one direction with respect to the frame, and other means mounted in the frame and engaging other of said perforations of the plate supporting means for moving the plate in another direction with respect to the frame.

22. In a meat-holding back plate, the combination with a frame, of meat engaging prongs on said frame, a movable plate, eccentric means for moving the plate in one direction with respect to the frame, other eccentric means for moving the plate in another direction with respect to the frame, and a spring-pressed locking device for engaging one of said eccentric means for holding the plate with respect to the frame.

In testimony whereof I have signed my name to this specification on this 13th day of July, A. D. 1916.

HENDRIK STUKART.